United States Patent [19]
Takagi et al.

[11] Patent Number: 6,031,296
[45] Date of Patent: Feb. 29, 2000

[54] POWER WINDOW APPARATUS

[75] Inventors: Isao Takagi; Akira Sasaki, both of Miyagi-ken, Japan

[73] Assignee: Alps Electric Co., Ltd., Japan

[21] Appl. No.: 09/108,685

[22] Filed: Jul. 1, 1998

[30] Foreign Application Priority Data

Jul. 1, 1997 [JP] Japan .................................. 9-175926

[51] Int. Cl.⁷ ............................................. H02H 5/00
[52] U.S. Cl. ........................ 307/10.1; 307/9.1; 49/28; 318/280; 701/49
[58] Field of Search ...................... 307/10.1, 9.1; 318/280, 256, 293; 49/28; 388/907; 701/49; 361/160, 166

[56] References Cited

U.S. PATENT DOCUMENTS 5,121,038  6/1992  Yamamura et al. ................. 318/256
5,138,182  8/1992  Kokubu ............................. 307/10.1
5,572,098  11/1996 Dreon et al. ........................ 318/293
5,731,675  3/1998  McCarthy .......................... 388/907
5,867,357  2/1999  Michel et al. ...................... 361/31

*Primary Examiner*—Albert W. Paladini
*Attorney, Agent, or Firm*—Brinks Hofer Gilson & Lione

[57] ABSTRACT

In a power window apparatus in which between a car power source and a ground, a first series circuit formed of a first switch and a first relay and a second series circuit formed of a second switch and a second relay are connected; when the first switch is operated, the first relay is energized, a motor is rotated in one direction due to switching of contacts of the first relay, and a window is raised; and when the second switch is operated, the second relay is energized, the motor is rotated in the other direction due to switching of contacts of the second relay, and the window is lowered, the first switch and the second switch each have one circuit with two contacts, and the fixed contacts which are switched when the first switch or the second switch is not operated are grounded.

6 Claims, 4 Drawing Sheets

POWER WINDOW APPARATUS

BACKGROUND OF THE INVENTION

1. Field of the Invention

The present invention relates to power window apparatuses, and more specifically, to a power window apparatus which allows a door window to be opened by an operation of a window lowering switch if a car drops into water from some reason.

2. Description of the Related Art

If a car accidentally drops into water, electrical insulation between the contacts of a window raising switch and between those of a window lowering switch is unlikely to be maintained in a power window apparatus used for the car. Although each contact of the window raising switch and the window lowering switch is open, actually they are electrically connected. Therefore, even if the window lowering switch is operated, the lowering operation of the window, namely, an opening operation of the window cannot be performed.

FIG. 5 is a circuit configuration of a main part of such a conventional power window apparatus.

As shown in FIG. 5, the power window apparatus is formed of a window raising switch 21, a window raising relay 22 and its contacts $22_1$, a window lower switch 23, a window lowering relay 24 and its contacts $24_1$, an automatic raising switch 25, an automatic lowering switch 26, a window opening and closing motor 27, a control integrated circuit (IC) 28, and a car power source (battery) 29.

Between the car power source 29 and the ground, the window raising switch 21 and the window raising relay 22 are connected in series, and the window lowering switch 23 and the window lowering relay 24 are also connected in series. A connection point "a" between the window raising switch 21 and the window raising relay 22 is connected to a pin (1) of the control integrated circuit 28. A connection point "b" between the window lowering switch 23 and the window lowering relay 24 is connected to a pin (2) of the control integrated circuit 28. The automatic raising switch 25 is connected between the connection point "a" and a pin (3) of the control integrated circuit 28. The automatic lowering switch 26 is connected between the connection point "b" and the pin (3) of the of the control integrated circuit 28. Among the contacts $22_1$ of the window raising relay 22; a movable contact is connected to one end of the window opening and closing motor 27, one fixed contact is connected to the car power source 29, and the other fixed contact is connected to the ground. Among the contacts $24_1$ of the window lowering relay 24, a movable contact is connected to the other end of the window opening and closing motor 27, one fixed contact is connected to the car power source 29, and the other fixed contact is connected to the ground. A pin (4) of the control integrated circuit 28 is connected to the window raising relay 24, and a pin (5) is connected to the window lowering relay 24, and a pin (6) is connected to the car power source 29.

The power window apparatus configured as described above will roughly operate in the following way.

When a driver of the car operates the window raising switch 21, its contacts are closed and the car power source 29 drives the window raising relay 22. The contacts $22_1$ of the window raising relay 22 are switched on, the window opening and closing motor 27 rotates in one direction, and thereby the window moves in the raising direction (closing direction). When the driver stops operating the window raising switch 21, the contacts become open and driving of the window raising relay 22 is stopped. Therefore, the window opening and closing motor 27 also stops rotating and raising of the window stops. When the driver operates the window lowering switch 23, its contacts are closed and the power source 29 drives the window lowering relay 24. The contacts $24_1$ of the window lowering relay 24 are switched on, the window opening and closing motor 27 rotates in the other direction, and hereby the window moves in the lowering direction (opening direction). When the driver stops operating the window lowering switch 23, the contacts become open and driving of the window lowering relay 24 is stopped. Therefore, the window opening and closing motor 27 also stops rotating and lowering of the window stops.

When the driver operates the automatic raising switch 25, its contacts are closed, the window raising switch 21 is operated at the same time, and its contacts also become closed. Since the contacts of the window raising switch 21 are closed, the car power source 29 drives the window raising relay 22. In the same way as when the window raising switch 21 is operated as described above, the window opening and closing motor 27 rotates in one direction, and thereby the window moves in the raising direction (closing direction). Since the contacts of the window raising switch 21. are closed and those of the automatic raising switch 25 are closed, the voltage obtained at the connection point "a" is supplied to the pins (1) and (3) of the control integrated circuit 28. In response to the supply of voltage, the voltage of the car power source 29 is latched and output from the pin (4) of the control integrated circuit 28, and sent to the window raising relay 22. Therefore, even if the operation of the automatic raising switch 25 is stopped, its contacts become open, the operation of the window raising switch 21 is stopped at the same time, and its contacts become open. Since the voltage output from the pin (4) has been latched, the window raising relay 22 continues being driven, the window opening and closing motor 27 rotates in one direction, and thereby the window continues moving in the raising direction (closing direction). The window continues moving in the raising direction (closing direction) until the window is fully closed.

In the same way, when the driver operates the automatic lowering switch 26, its contacts are closed, the window lowering switch 23 is operated at the same time, and its contacts also become closed. In the same way as when the window lowering switch 23 is operated as described above, the window opening and closing motor 27 rotates in the other direction, and thereby the window moves in the lowering direction (opening direction). Since the contacts of the window lowering switch 23 are closed and those of the automatic lowering switch 26 are closed, the voltage obtained at the connection point "b" is supplied to the pins (2) and (3) of the control integrated circuit 28. In response to the supply of this voltage, the voltage of the car power source 29 is latched and output from the pin (5) of the (control integrated circuit 28, and sent to the window lowering relay 24. Therefore, even if the operation of the automatic lowering switch 26 is stopped, its contacts become open, the operation of the window lowering switch 23 is stopped at the same time, and its contacts become open. Since the voltage output from the pin (5) has been latched, the window lowering relay 24 continues being driven, the window opening and closing motor 27 rotates in the other direction, and thereby the window continues moving in the lowering direction (opening direction). The window continues moving in the lowering direction (opening direction) until the window is fully opened.

If the car drops into water for some reason, and the window raising switch 21 and the window lower switch 23 in the conventional power window apparatus are submerged in water, water connects the contacts of each switch as resistors allowing continuity. Although each contact of the window raising switch 21 and the window lowering switch 23 is open, the output of the car power source 29 is applied to the window raising relay 22 and the window lowering relay 24. The window raising relay 22 and the window lowering relay 24 are driven at the same time, or they are half driven at the same time. As a result, their contacts $22_1$ and $24_1$ are switched at the same time, or the contacts $22_1$ and $24_1$ cannot switched to either fixed contacts. In this condition, even if the driver operates the window lowering switch 23 to open the window, the window opening and closing motor 27 is not rotated.

As described above, if the car drops into water accidentally and the conventional power window apparatus is submerged in water, the apparatus cannot be operated normally any more.

SUMMARY OF THE INVENTION

Accordingly, it is an object of the present invention to provide a power window apparatus which allows a window to open with a switch operation even if the car drops into water accidentally and is submerged in water.

Another object of the present invention is to provide a power window apparatus which allows a window to automatically open without a switch operation if the car drops into water and is submerged in water.

One of the foregoing objects is achieved according to one aspect of the present invention through the provision of a power window apparatus including: a first series circuit with a first switch and a first relay, connected between a car power source and a ground; a second series circuit with a second switch and a second relay, connected between the car power source and the ground; and a motor connected to one of the contacts of the first relay at one side and to one of the contacts of the second relay in the other side, rotated in one direction due to switching of the contacts in the first relay when the first switch is operated to raise a window, and rotated in the other direction due to switching of the contacts in the second relay when the second switch is operated to lower the window, wherein the first switch and the second switch each have one circuit with two contacts, and the fixed contacts which are switched when the first switch or the second switch is not operated are grounded.

In the power window apparatus, the fixed contacts which are switched when the first switch or the second switch is not operated may be grounded through minute gaps.

One of the foregoing objects is also achieved according to another aspect of the present invention through the provision of a power window apparatus including: a first series circuit with a first switch and a first relay, connected between a car power source and a ground; a second series circuit with a second switch and a second relay, connected between the car power source and the ground; and a motor connected to one of the contacts of the first relay at one side and to one of the contacts of the second relay in the other side, rotated in one direction due to switching of the contacts in the first relay when the first switch is operated to raise a window, and rotated in the other direction due to switching of the contacts in the second relay when the second switch is operated to lower the window, wherein the first switch and the second switch each have one circuit with two contacts, and the fixed contacts which are switched when the first switch or the second switch is not operated are connected to the car power source.

According to these aspects of the present invention, even if a car accidentally drops into water, a portion where the first switch and the second switch are disposed is submerged in water, and water connects the contacts of the first switch and also connects those of the second switch as resistors allowing continuity, since a current caused by the voltage of the car power source flows into the ground through the water serving as resistors allowing continuity and the movable contacts switched to the fixed contacts connected to the ground, the voltage of the car power source is not applied to the first relay or the second relay. Neither the first relay nor the second relay is operated due to connection by water serving as resistors allowing continuity. In such a condition, when the car driver operates the second switch, since the movable contacts are switched to the fixed contacts connected to the car power source or to the fixed contacts connected to the ground, and the contacts become short-circuited, which were connected by water serving as a resistor allowing continuity, the voltage of the car power source is applied to the second relay to drive it. The contacts thereof are switched, the motor is rotated in the other direction, and the window is opened.

The other of the foregoing objects is achieved according to still another aspect of the present invention through the provision of a power window apparatus including: a first series circuit with a first switch and a first relay, connected between a car power source and a ground; a second series circuit with a second switch and a second relay, connected between the car power source and the ground; and a motor connected to one of the contacts of the first relay at one side and to one of the contacts of the second relay in the other side, rotated in one direction due to switching of the contacts in the first relay when the first switch is operated to raise a window, and rotated in the other direction due to switching of the contacts in the second relay when the second switch is operated to lower the window, wherein the first switch has one circuit with two contacts, the fixed contact which is switched when the first switch is not operated is grounded, and the second switch is open when not operated.

According to this aspect of the present invention, if a car drops into water, a portion where the first switch and the second switch are disposed is submerged in water, and water connects the contacts of the first switch and those of the second switch as resistors allowing continuity, since a current caused by the voltage of the car power source flows into the ground through the water at the first switch and the movable contact switched to the fixed contact connected to the ground, the voltage of the car power source is not applied to the first relay and the first relay is not operated due to connection by water serving as a resistor allowing continuity. On the other hand, the voltage of the car power source is applied to the second relay through the water at the second switch to drive the second relay. The contacts of the second relay are switched, the motor is rotated in the other direction, and the window is automatically opened.

Other objects and features of the present invention will become understood from the following description with reference to the accompanying drawings.

DESCRIPTION OF THE PREFERRED EMBODIMENTS

Figure 1:
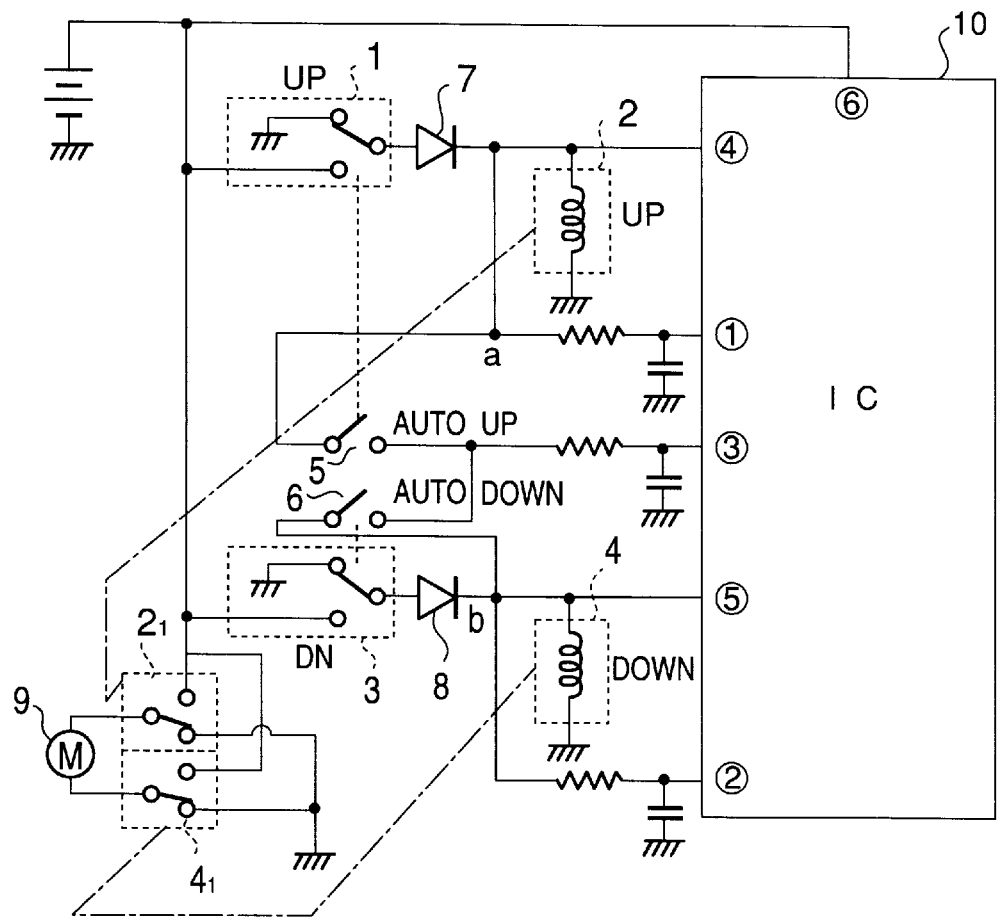
FIG. 1 is a circuit diagram showing a circuit configuration of a main section of a power window apparatus according to a first embodiment of the present invention.

Embodiments of the present invention will be described below by referring to the drawings.

FIG. 1 is a circuit diagram showing a circuit configuration of a main part of a power window apparatus according to a first embodiment of the present invention.

As shown in FIG. 1, the power window apparatus of the first embodiment is formed of a window raising switch (a first switch) 1, a window raising relay (a first relay) 2 and its contacts $2_1$, a window lowering switch (a second switch) 3, a window lowering relay (a second relay) 4 and its contacts $4_1$, an automatic raising switch 5, and automatic lowering switch 6, a first reverse-current-blocking diode 7, a second reverse-current-blocking diode 8, a window opening and closing motor 9, a control integrated circuit (IC) 10, and a car power source (battery) 11.

Between the car power source 11 and the ground, a first series circuit formed of the window raising switch 1, the first reverse-current-blocking diode 7, and the window raising relay 2, and a second series circuit formed of the window lowering switch 3, the second reverse-current-blocking diode 8, and the window lowering relay 4 are connected. The window raising switch 1 and the window lowering switch 2 each have one circuit with two contacts. Their normally closed, fixed contacts are grounded, their normally open, fixed contacts are connected to the car power source 11, and their movable contacts are connected to the first reverse-current-blocking diode 7 and the second reverse-current-blocking diode 8. A connection point "a" between the window raising relay 2 and the first reverse-current-blocking diode 7 is connected to a port (1) of the control integrated circuit 10. A connection point "b" between the window lowering relay 4 and the second reverse-current-blocking diode 8 is connected to a port (2) of the control integrated circuit 10. One end of the automatic raising switch 5 is connected to the connection point "a" and the other end is connected to a port (3) of the control integrated circuit 10. One end of the automatic lowering switch 6 is connected to the connection point "b" and the other end is connected to a port (3) of the control integrated circuit 10. Among the contacts $2_1$ of the window raising relay 2, a movable contact is connected to one end of the window opening and closing motor 9, one fixed contact is connected to the car power source 11, and the other fixed contact is connected to the ground. Among the contacts $4_1$ of the window lowering relay 4, a movable contact is connected to the other end of the window opening and closing motor 9., one fixed contact is connected to the car power source 11, and the other fixed contact is connected to the ground. A port (4) of the control integrated circuit 10 is connected to the connection point between the window raising relay 2 and the first reverse-current-blocking diode 7, a port (5) is connected to the connection point between the window lowering relay 4 and the second reverse-current-blocking diode 8, and a port (6) is connected to the car power source 11.

The power window apparatus configured as described above according to the first embodiment will roughly operate in the following way.

When a car driver operates the window raising switch 1, its contacts are switched from the normally closed, fixed contact side (shown) to the normally open, fixed contact side. The voltage of the car power source 11 is applied to the window raising relay 2 through the window raising switch 1 and the first reverse-current-blocking diode 7 to drive the window raising relay 2. Then, the contacts $2_1$ of the window raising relay 2 are switched from the connection condition shown in the figure to the other connection condition. The voltage of the car power source 11 is applied to the window opening and closing motor 9 to rotate the motor 9 in one direction. With the rotation of the window opening and closing motor 9 in one direction, the window is raised, namely, the window is moved in the closing direction. When the operation of the window raising switch 1 is stopped, its contacts are switched to the normally-closed, fixed contact side (shown). Since the voltage of the car power source 11 is blocked by the window raising switch 1 and the driving of the window raising relay 2 is stopped, the window opening and closing motor 9 is stopped rotating. The raising of the window is stopped, and the window is held at that position.

When the driver operates the window lowering switch 3, its contacts are switched from the normally closed, fixed contact side shown in the figure to the normally open, fixed contact side. The voltage of the car power source 11 is applied to the window lowering relay 4 through the window lowering switch 3 and the second reverse-current-blocking diode 8 to drive the window lowering relay 4. Then, the contacts $4_1$ of the window lowering relay 4 are switched from the connection condition shown in the figure to the other connection condition. The voltage of the car power source 11 is applied to the window opening and closing motor 9 to rotate the motor in the other direction. With the rotation of the window opening and closing motor 9 in the other direction, the window is lowered, namely, the window is moved in the opening direction. When the operation of the window lowering switch 3 is stopped, its contacts are switched to the normally-closed, fixed contact side. Since the voltage of the car power source 11 is blocked by the window lowering switch 3 and the driving of the window lowering relay 4 is stopped, the window opening and closing motor 9 is stopped rotating. The lowering of the window is stopped, and the window is held at that position.

When the driver operates the automatic raising switch 5, the window raising switch 1 is also operated at the same time accordingly, the contacts of the automatic raising switch 5 are closed, and the contacts of the window raising switch 1 are also switched from the normally-closed, fixed contact side shown in the figure to the normally-open, fixed contact side. When the contacts of the window raising switch 1 are switched to the normally-open, fixed contact side, the voltage of the car power source 11 is applied to the window raising relay 2 through the window raising switch 1 and the first reverse-current-blocking diode 7 to drive the window raising relay 2 in the same way as when the window raising switch 1 is operated, as described above. Then, the window opening and closing motor 9 is rotated in one direction. With the rotation of the window opening and closing motor 9 in one direction, the window is raised, namely, the window is moved in the closing direction. Since the contacts of the window raising switch 1 are switched to the normally-open, fixed contact side, and those of the automatic raising switch 5 are closed, the voltage obtained at the connection point "a" is supplied to the ports (1) and (3) of the control integrated circuit 10. In response to the supply of this voltage, the control integrated circuit 10 latches the voltage of the car power source 11, applied to the port (5), and outputs it from the port (4) to apply to the window raising relay 2. If the operation of the automatic raising switch 5 is stopped and the operation of the window raising switch 1 is stopped accordingly, the contacts of the window raising switch 1 are switched from the normally-open, fixed contact side to the normally-closed, fixed contact side, and the supply of the voltage of the car power source 11 to the window raising relay 2 through the window raising switch 1 is stopped. Since the voltage of the car power source 11 output from the port (4) of the control integrated circuit 10 has been latched, and the voltage is still being applied to the window raising relay 2, the window raising relay 2 continues being driven. Therefore, the window opening and closing motor 9 continues rotating in one direction, and thereby the window continues moving in the raising direction. The window continues moving in the raising direction until the window reaches the top so that it is fully closed. In this case, the first reverse-current-blocking diode 7 is connected such that the voltage of the car power source 11, output from the port (4) of the control integrated circuit 10, is all applied to the window raising relay 2.

In the same way as described above, when the driver operates the automatic lowering switch 6, the window lowering switch 3 is also operated at the same time accordingly, the contacts of the automatic lowering switch 6 are closed, and the contacts of the window lowering switch 3 are also switched from the normally-closed, fixed contact side shown in the figure to the normally-open, fixed contact side. When the contacts of the window lowering switch 3 are switched to the normally-open, fixed contact side, the voltage of the car power source 11 is applied to the window lowering relay 4 through the window lowering switch 3 and the second reverse-current-blocking diode 8 to drive the window lowering relay 4 in the same way as when the window lowering switch 3 is operated, as described above. Then, the window opening and closing motor 9 is rotated in the other direction. With the rotation of the window opening and closing motor 9 in this direction, the window is lowered, namely, the window is moved in the opening direction. Since the contacts of the window lowering switch 3 are switched to the normally-open, fixed contact side, and those of the automatic lowering switch 6 are closed, the voltage obtained at the connection point "b" is supplied to the ports (2) and (3) of the control integrated circuit 10. In response to the supply of this voltage, the control integrated circuit 10 latches the voltage of the car power source 11, applied to the port (6), and outputs it from the port (5) to apply to the window lowering relay 4. If the operation of the automatic lowering switch 6 is stopped and the operation of the window lowering switch 3 is stopped accordingly, the contacts of the window lowering switch 3 are switched from the normally-open, fixed contact side to the normally-closed, fixed contact side, and the supply of the voltage of the car power source 11 to the window lowering relay 4 through the window lowering switch 3 is stopped. Since the voltage of the car power source 11 output from the port (5) of the control integrated circuit 10 has been latched, and the voltage is still being applied to the window lowering relay 4, the window lowering relay 4 continues being driven. Therefore, the window opening and closing motor 9 continues rotating in the other direction, and thereby the window continues moving in the lowering direction. The window continues moving in the lowering direction until the window reaches the bottom so that it is fully opened. In this case, the second reverse-current-blocking diode 8 is connected such that the voltage of the car power source 11, output from the port (5) of the control integrated circuit 10, is all applied to the window lowering relay 4.

When the windows of the car are closed, if the car drops into water for some reason, the power window apparatus mounted inside a door is submerged in water, and the window raising switch 1 and the window lowering switch 3 are also submerged in water. Although the power window apparatus is water-proof at its peripheral circuit, and the window raising switch 1 and the window lowering switch 3 are also water-proof, when the power window apparatus is submerged in water, the water comes into the window raising switch 1 and the window lowering switch 3 through small gaps. When the window raising switch 1 and the window lowering switch 3 are submerged in water, water connects their normally-open, fixed contacts and movable contacts as resistors allowing continuity. Since the normally-closed, fixed contacts of the window raising switch 1 and the window lowering switch 3 are grounded, a current caused by the voltage of the car power source 11 flows into the ground through the water between the normally-open, fixed contact and the movable contact, and the contacts switched to the normally-closed, fixed contact side in each of the window raising switch 1 and the window lowering switch 3. Consequently, the voltage is not applied to the window raising relay 2 or the window lowering relay 4. Therefore, the contacts $2_1$ and $4_1$ of the window raising relay 2 and the window lowering relay 4 are in the connection conditions shown in the figure, and the window opening and closing motor 9 is not rotated.

In such a condition, when the driver operates the window lowering switch 3, its contacts are switched from the normally-closed, fixed contact side to the normally-open, fixed contact side. The normally-open, fixed contact and the movable contact become short-circuited by the switching of the contacts, which were connected by water serving as a resistor allowing continuity. At the same time, the connection between the normally-closed, fixed contact and the movable contact is changed from the short-circuited condition to the open condition, and they are connected by water serving as a resistor allowing continuity. Therefore, the voltage of the car power source 11 is applied to the window lowering relay 4 through the window lowering switch 3 which is in the short-circuited condition to drive the window lowering relay 4. With the window lowering relay 4 being driven, its contacts $4_1$ are switched from the connection condition shown in the figure to the other connection condition. The voltage of the car power source 11 is applied to the window opening and closing motor 9 to drive the motor 9 in the other direction. With this operation, since the window is lowered and opened, the driver and other passengers can escape from the opened window.

As described above, even if the power window apparatus according to the first embodiment is submerged in water when the car accidentally drops into water, a window can be opened by operating the window lowering switch 3.

In the power window apparatus according to the first embodiment, a one-circuit switch with two contacts in which the normally-closed, fixed contact is grounded is used for the window raising switch 1 and the window lowering switch 3. Instead, a one-circuit switch with two contacts in which the normally-closed, fixed contact is not directly grounded but grounded through a minute gap may be used.

Figure 2:
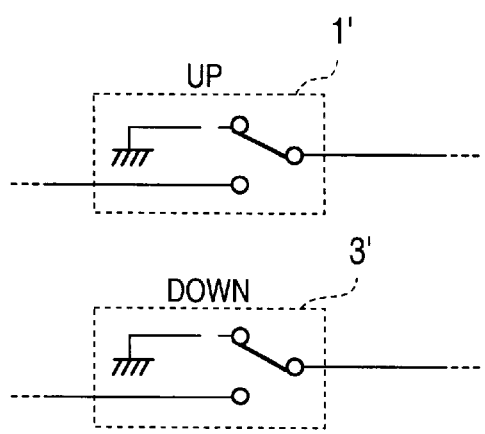
FIG. 2 is a circuit diagram showing another configuration of a window raising switch and a window lowering switch.

FIG. 2 shows a case in which such switches are used. FIG. 2 is a circuit diagram of a window raising switch and a window lowering switch.

As shown in FIG. 2, a window raising switch 1' is the same as the window raising switch 1 according to the first embodiment in terms of being a one-circuit switch with two contacts, but differs from the window raising switch 1 in that the normally-closed, fixed contact is grounded through a minute gap instead of being directly grounded. In the same way, a window lowering switch 3' is the same as the window lowering switch 3 according to the first embodiment in terms of being a one-circuit switch with two contacts, but differs from the window lowering switch 3 in that the normally-closed, fixed contact is grounded through a minute gap instead of being directly grounded.

With the use of the window raising switch 1' and the window lowering switch 3' having such a configuration, the power window apparatus is suited to a case in which water has a relatively-small resistance and the voltage of the car power source 11 is much consumed if there is only the water serving as a resistor allowing continuity, between the normally-closed, fixed contact and the movable contact.

In the power window apparatus according to the first embodiment, the window raising switch 1 and the first reverse-current-blocking diode 7 are connected to the car-power-source (11) side of the window raising relay 2, and the window lowering switch 3 and the second reverse-current-blocking diode 8 are connected to the car-power-source (11) side of the window lowering relay 4. The power window apparatus may be configured such that the window raising switch 1 and the first reverse-current-blocking diode 7 are connected to the ground side of the window raising relay 2, and the window lowering switch 3 and the second reverse-current-blocking diode 8 are connected to the ground side of the window lowering relay 4.

Figure 3:
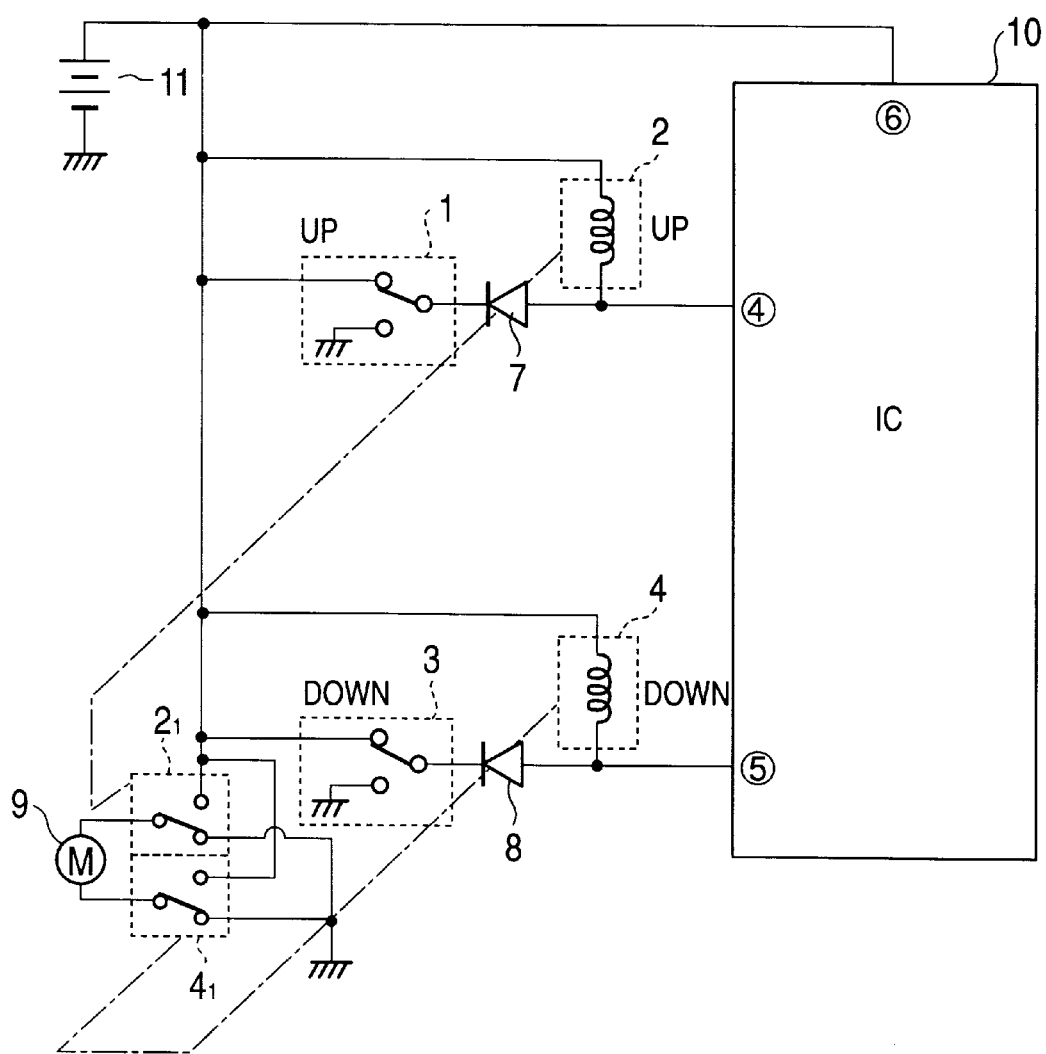
FIG. 3 is a circuit diagram showing a circuit configuration in a case in which the window raising switch is connected to the ground side of a window raising relay and the window lowering switch is connected to the ground side of the window lowering relay.

FIG. 3 is a circuit diagram of a power window apparatus in which a window raising switch 1 is connected to the ground side of a window raising relay 2 and a window lowering switch 3 is connected to the ground side of a window lowering relay 4, with only the portion directly related to the window raising relay 2 and the window lowering relay 4 being illustrated.

In FIG. 3, the same symbols are assigned to the same components as those used in FIG. 1.

As shown in FIG. 3, the normally-closed, fixed contact of the window raising switch 1 is connected to a car power source 11, the normally-open, fixed contact is grounded, and the movable contact is connected to the other end (ground-side terminal) of the window raising relay 2 through a first reverse-current-blocking diode 7. One end (power-side terminal) of the window raising relay 2 is directly connected to the car power source 11. The normally-closed, fixed contact of the window lowering switch 3 is connected to the car power source 11, the normally-open, fixed contact is grounded, and the movable contact is connected to the other end (ground-side terminal) of the window lowering relay 4 through a second reverse-current-blocking diode 8. One end (power-side terminal) of the window lowering relay 4 is directly connected to the car power source 11.

Since tie operation of the power window apparatus having the above configuration s substantially the same as that of the power window apparatus according to the first embodiment, a detailed description thereof will be omitted.

Also in the power window apparatus having the above configuration, the window raising switch 1' and the window lowering switch 3', shown in FIG. 2, may be used.

In each of the above cases, if the car accidentally drops into water and the power window apparatus is submerged in water, a window can be opened by operating the window lowering switch 3. It is preferred that a window be automatically opened without operating the window lowering switch 3 if the power window, apparatus is submerged in water.

Figure 4:
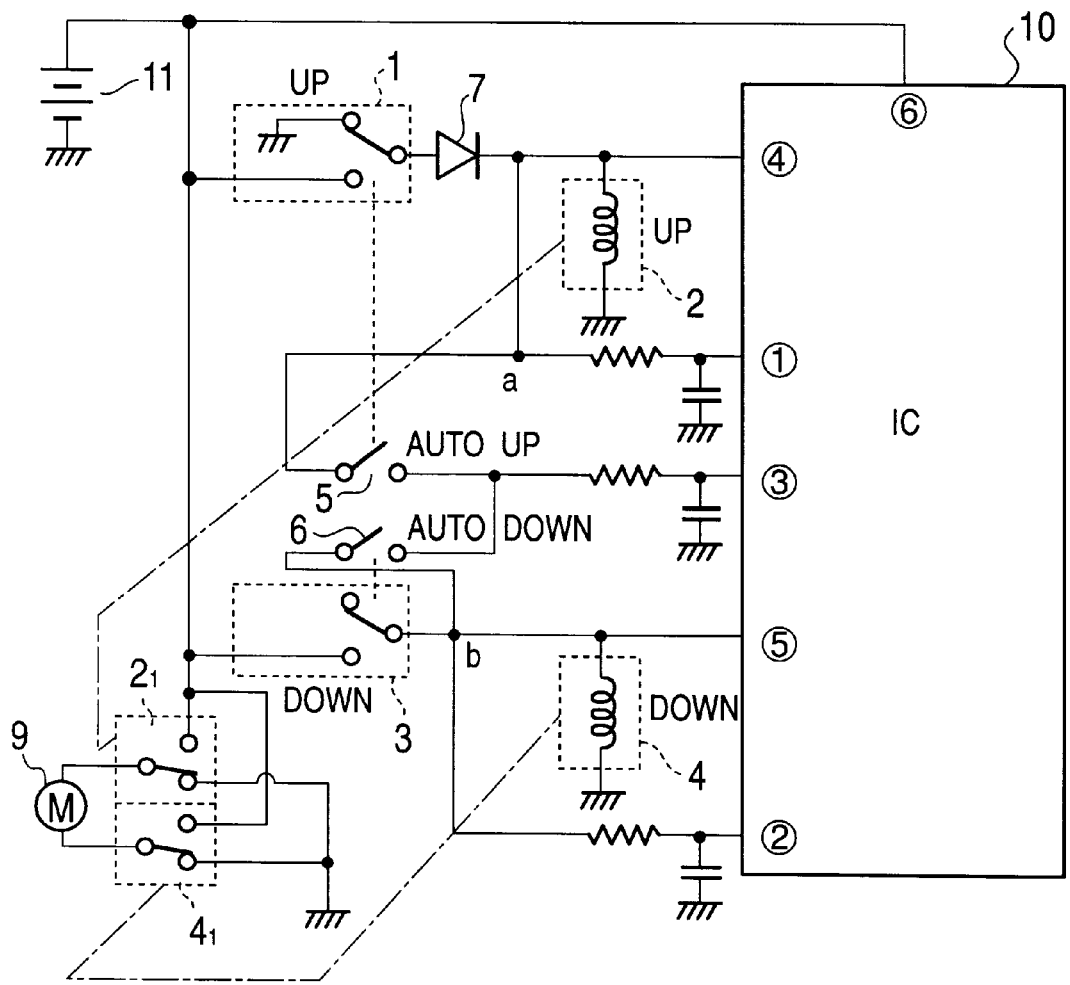
FIG. 4 is a circuit diagram showing a circuit configuration of a main section of a power window apparatus according to a second embodiment of the present invention.
Figure 5:
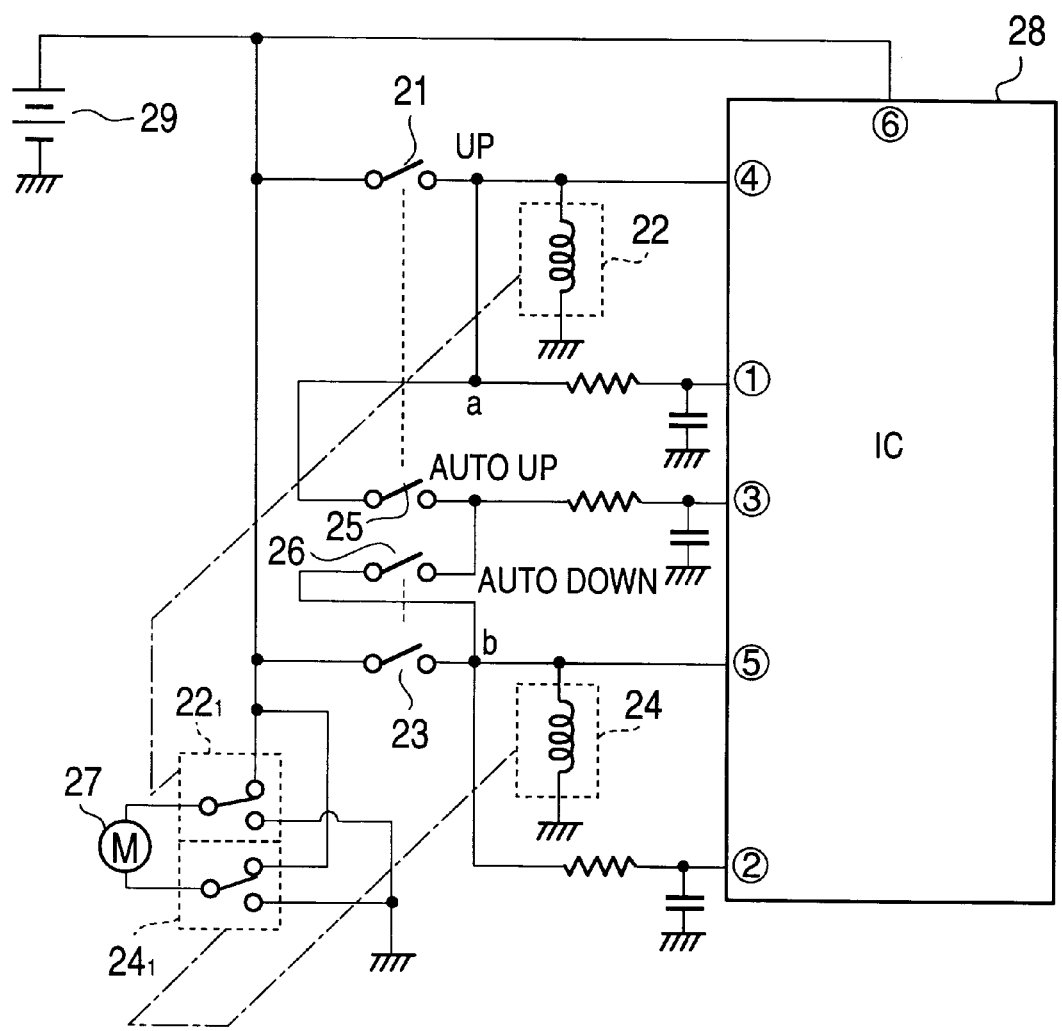
FIG. 5 is a circuit diagram showing a circuit configuration of a main section of a conventional power window apparatus.

FIG. 4 is a circuit diagram showing a circuit configuration of a main section of a power window apparatus according to a second embodiment of the present invention. This power window apparatus allows a window to be opened automatically if the apparatus is submerged in water.

In FIG. 4, the same symbols are assigned to the same components as those shown in FIG. 1.

The second embodiment shown in FIG. 4 differs from the first embodiment shown in FIG. 1 only in that, in the window lowering switch formed of a one-circuit switch with two contacts, whereas the normally-closed, fixed contact is grounded in the first embodiment, the normally-closed, fixed contact is open in the second embodiment; and whereas the second reverse-current-blocking diode 8 is used in the first embodiment, the second reverse-current-blocking diode 8 is not used in the second embodiment. The second embodiment does not have any other differences in configuration from the first embodiment. Therefore, further descriptions of the configuration of the second embodiment will be omitted.

As for operations in the second embodiment, since normal operations, that is, an operation performed when the window raising switch 1 is operated, an operation performed when the window lowering switch 3 is operated, an operation performed when the automatic raising switch 5 is operated, and an operation performed when the automatic lowering switch 6 is operated, are substantially the same as the corresponding operations in the first embodiment, that is, the operation performed when the window raising switch 1 is operated, an operation performed when the window lowering switch 3 is operated, an operation performed when the automatic raising switch 5 is operated, and an operation performed when the automatic lowering switch 6 is operated, descriptions of these operations will be omitted. An operation of the power window apparatus performed if the apparatus is submerged in water will be described below.

When the windows of a car are closed, if the car drops into water for some reason, the power window apparatus mounted inside a door is submerged in water, and, as described above, the window raising switch 1 and the window lowering switch 3 are also submerged in water. In the window raising switch 1, water connects the normally-open, fixed contact to the movable contact as a resistor allowing continuity. Since the normally-closed, fixed contact is grounded, a current caused by the voltage of the car power source 11 flows into the ground through the water between the normally-open, fixed contact and the movable contact, and the contacts switched to the normally-closed, fixed contact side. The voltage is not applied to the window raising relay 2. Therefore, the contacts 21 of the window raising relay 2 are maintained at the connection condition shown in the figure. The window lowering switch 3 is the same as the window raising switch 1 in that water connects the normally-open, fixed contact to the movable contact as a resistor allowing continuity, in submergence. Since the normally-closed, fixed contact is in the open condition, the voltage of the car power source 11 is applied to the window lowering relay 4 through the water serving as a resistor allowing continuity between the normally-open, fixed contact and the movable contact to drive the window lowering relay 4. With the window lowering relay 4 being driven, its contacts $4_1$ are switched from the connection condition shown in the figure to the other connection condition. The voltage of the car power source 11 is applied to the window opening and closing motor 9 to drive the motor 9 in the other direction. With this operation, since the window is lowered and automatically opened, the car driver and other passengers can escape from the open d window without operating the window lowering switch 3.

As described above, if the car drops into water accidentally and the power window apparatus according to the second embodiment is submerged in water, a window is automatically opened without operating the window lowering switch 3.

In the second embodiment, a one-circuit switch with two contacts is used for the window lowering switch 4, its normally-closed, fixed contact is made open, and the normally-open, fixed contact is connected to the car power source 11. The power window apparatus may be configured such that a normally-open switch with one circuit and one contact is used for the window lowering switch 4 and its fixed contact is connected to the car power source 11.

Also in this second embodiment, the window raising switch 1', shown in FIG. 2, may be used instead of the window raising switch 1.

In the power window apparatus according to the second embodiment, the window raising switch 1 is connected to the car-power-source side of the window raising relay 2, and the window lowering switch 3 is connected to the car-power-source side of the window lowering relay 4. The power window apparatus may be configured such that the window raising switch 1 is connected to the ground side of the window raising relay 2, and the window lowering switch 3 is connected to the ground side of the window lowering relay 4.

In each of the above embodiments, the automatic raising switch 5, the automatic lowering switch 6, and the control integrated circuit 10 are used. As a simplified power window apparatus, if the automatic raising switch 5, the automatic lowering switch 6, and the circuits related thereto, and the control integrated circuit 10 are omitted, the functions in each embodiment can be implemented.

As described above, since the window raising switch (the first switch) and the window lowering switch (the second switch) each have one circuit with two contacts, the fixed contacts which are switched when the first switch or the second switch is not operated are grounded or connected to the car power source, and the fixed contacts switched when the first switch and the second switch are operated are grounded, if a car drops into water, and water connects the contacts of the window raising switch (the first switch) and those of the window lowering switch (the second switch) as resistors allowing continuity due to submergence, a current caused by the voltage of the car power source flows into the ground through the water, and the voltage of the car power source does not drive the window raising relay (the first relay) or the window lowering relay (the second relay). In such a condition, when the window lowering switch (the second switch) is operated, the contacts become short-circuited by the switching of the contacts, which were connected by water serving as a resistor allowing continuity. The voltage of the car power source drives the window lowering relay (the second relay) and the motor is rotated to open the window. Therefore, a passenger can escape from the car.

Since the window raising switch (the first switch) has one circuit with two contacts, the fixed contact which is switched when the window raising switch (the first switch) is not operated is grounded, and the contacts of the window lowering switch (the second switch) are made open when the window lowering switch (the second switch) is not operated, if a car drops into water, and water connects the contacts of the window raising switch (the first switch) and those of the window lowering switch (the second switch) as resistors allowing continuity, due to submergence, a current caused by the voltage of the car power source flows into the ground through the water at the window raising switch (the first switch), and the voltage of the car power source does not drive the window raising relay (the first relay). On the other hand, the voltage of the car power source drives the window lowering relay (the second relay) through the water at the window lowering switch (the second switch) and the motor is rotated to automatically open the window. Therefore, a passenger can escape from the car without operating the window lowering switch (the second switch).

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A power window apparatus comprising:
   a first series circuit with a first switch and a first relay, connected between a car power source and a ground;
   a second series circuit with a second switch and a second relay, connected between a car power source and the ground; and
   a motor having two sides, a first side of the motor connected with the first relay and a second side of the motor connected with the second relay, the motor being rotated in one direction due to switching the first relay when the first switch is operated to raise a window, and rotated in an opposite direction due to switching the second relay when the second switch is operated to lower the window,
   wherein the first switch and the second switch each have a circuit with a movable contact and a pair of fixed contacts, one of the paired fixed contacts in each of the first switch and the second switch is connected to the ground and the other of the paired fixed contacts is connected to the car power source, and the movable contact in each of the first switch and the second switch connects to the fixed contact connected to the ground when each of the first switch and the second switch is not operated.

2. A power window apparatus according to claim 1, wherein the fixed contacts connected to the ground are grounded through minute gaps.

3. A power window apparatus comprising:
   a first series circuit with a first switch and a first relay, connected between a car power source and a ground;
   a second series circuit with a second switch and a second relay, connected between a car power source and the ground; and
   a motor having two sides, a first side of the motor connected with the first relay and a second side of the motor connected with the second relay, the motor being rotated in one direction due to switching the first relay when the first switch is operated to raise a window, and rotated in an opposite direction due to switching the second relay when the second switch is operated to lower the window,
   wherein the first switch has a circuit with a movable contact and a pair of fixed contacts, and one of the paired fixed contacts is connected to the ground and the other of the paired fixed contacts is connected to the car power source, and the movable contact connects to the fixed contact connected to the ground when the first switch is not operated, and the second switch is open when not operated.

4. A power window apparatus according to claim 3, wherein the fixed contact connected to the ground is grounded through a minute gap.

5. A power window apparatus comprising:
- a first series circuit with a first switch and a first relay, connected between a car power source and a ground;
- a second series circuit with a second switch and a second relay, connected between a car power source and the ground; and
- a motor having two sides, a first side of the motor connected with the first relay and a second side of the motor connected with the second relay, the motor being rotated in one direction due to switching the first relay when the first switch is operated to raise a window, and rotated in an opposite direction due to switching the second relay when the second switch is operated to lower the window,
- wherein the first switch and the second switch each have a circuit with a movable contact and a pair of fixed contacts, one of the paired fixed contacts in each of the first switch and the second switch is connected to the ground and the other is connected to the car power source, and the movable contact in each of the first switch, and the second switch connects to the fixed contact connected to the car power source when each of the first switch and the second switch is not operated.

6. A power window apparatus comprising:
- a first series circuit with a first switch and a first relay, connected between a car power source and a ground;
- a second series circuit with a second switch and a second relay, connected between a car power source and the ground; and
- a motor having two sides, a first side of the motor connected with the first relay and a second side of the motor connected with the second relay, the motor being rotated in one direction due to switching the first relay when the first switch is operated to raise a window, and rotated in an opposite direction due to switching the second relay when the second switch is operated to lower the window,
- wherein at least the first switch has a circuit with a movable contact and a pair of fixed contacts, one of the paired fixed contacts is connected to the ground and the other is connected to the car power source, and the movable contact connects to the fixed contact connected to the ground when the first switch is not operated.

* * * * *